United States Patent Office 3,251,643
Patented May 17, 1966

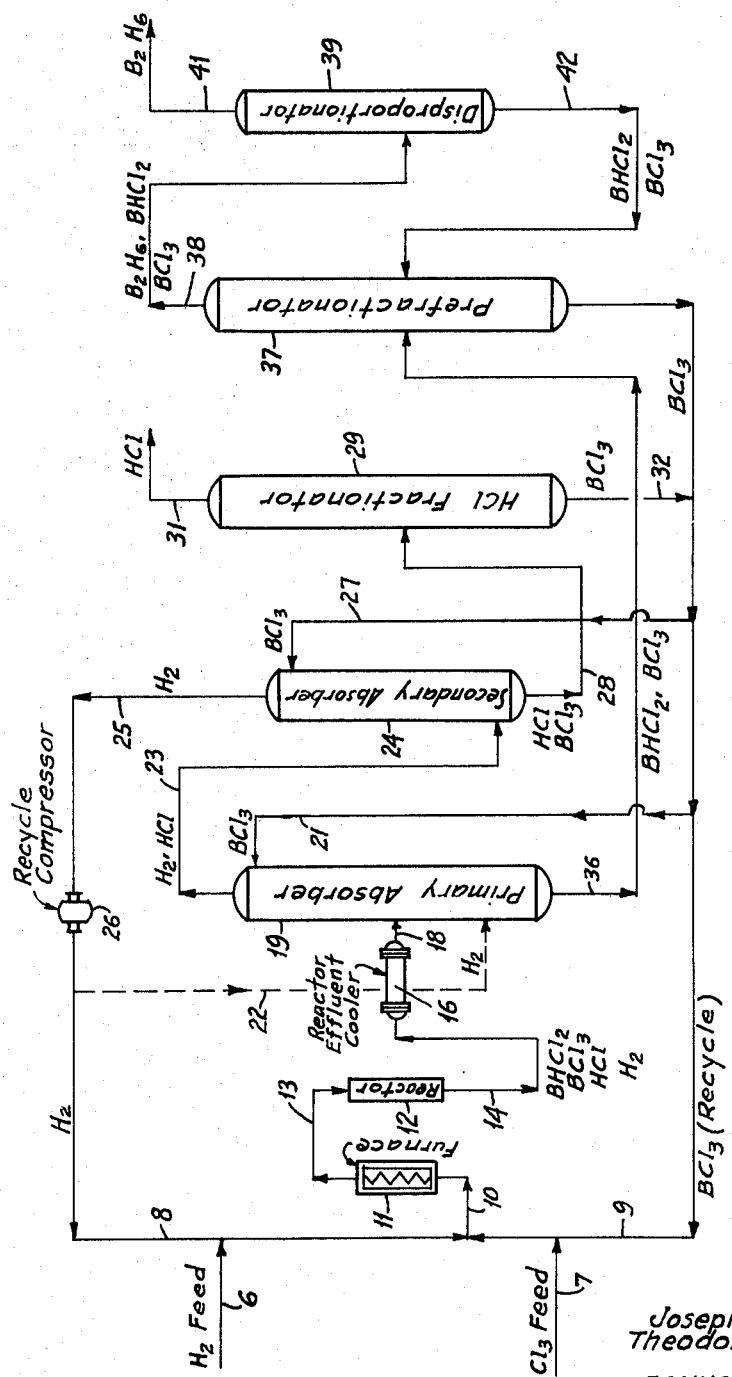
INVENTORS
Joseph Adinoff
Theodore A. Dungan
ECKHOFF & SLICK
ATTORNEYS

3,251,643
PROCESS FOR THE MANUFACTURE OF DIBORANE
Joseph Adinoff, Los Angeles, and Theodore A. Dungan, Atherton, Calif., assignors to American Potash & Chemical Corporation, a corporation of Delaware
Filed Mar. 2, 1960, Ser. No. 12,472
3 Claims. (Cl. 23—14)

This invention relates to a continuous process for the manufacture of diborane by reaction of boron trichloride and hydrogen.

Diborane can be prepared by reacting a hydride or a borohydride with a boron halide in an organic solvent for the boron halide as in U.S. Patent 2,544,472. These other materials are either more expensive or are more difficult to handle in the process than are hydrogen and boron trichloride, which are each readily available and relatively inexpensive as compared to other reactants suitable for the manufacture of diborane. In addition, hydrogen and boron trichloride can be reacted under moderate operating conditions when one proceeds in accordance with the practice of the present invention.

The preparation of diborane from hydrogen and boron trichloride in an electric discharge was reported by Schlesinger and Burg, J. Am. Chem. Soc., 53, 4321 (1931). Later, Hurd (U.S. Patent 2,469,879) passed hydrogen and boron halide vapor through a bed of active metals at temperatures between 200° and 400° C. The yield of the diborane, according to Schlesinger and Burg, was about a 25% conversion of the boron halide passed through the reaction chamber, while the only yield reported by Hurd was about 2%.

The reaction involved in formation of diborane from boron trichloride and hydrogen probably proceeds in two steps:

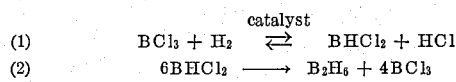

(1) $BCl_3 + H_2 \underset{}{\overset{catalyst}{\rightleftarrows}} BHCl_2 + HCl$

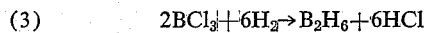

(2) $6BHCl_2 \longrightarrow B_2H_6 + 4BCl_3$

The overall or summarization reaction may be shown as:

(3) $2BCl_3 + 6H_2 \rightarrow B_2H_6 + 6HCl$

The first reaction involves an equilibrium and is reversible. We have found that the yield of diborane is materially improved if the products issuing from the reaction zone are cooled as quickly as possible to a temperature whereat Reaction 1 is non-reversible or nearly so. When the reaction products are cooled quickly, the dichloroborane content in the reaction products is fixed at a value determined by the equilibrium attained by reversible Reaction 1 in the reaction zone.

To provide an efficient and economical process which can be operated continuously, it is also necessary that the products of reaction be freed of unreacted hydrogen and boron trichloride for recycle in the process. In addition, the hydrogen chloride must be separated and preferably recovered as a usable or salable product. Stated differently, in producing diborane by reacting hydrogen and boron trichloride one must effect two separations, one being the separation of the hydrogen and the hydrogen chloride from the dichloroborane and boron trichloride, and the other being the separation of hydrogen chloride from the hydrogen.

We have found that both the quick quenching of the reaction products to lower their temperature to one whereat the reversible reaction does not occur and the separation steps can be readily accomplished through the use of boron trichloride as a cooling medium, solvent and absorbant. In addition, we have found that boron trichloride can be used as solvent medium, first, to effect separation of the hydrogen-hydrogen chloride from the boron trichloride-dichloroborane, and, second, to effect separation of the hydrogen and hydrogen chloride. Since boron trichlororide is one of the reactants, it is not necessary to remove it from any stream returned as recycle, thus materially simplifying the procedure and improving efficiency, as compared to any prior art process.

In the drawings accompanying and forming a part hereof, the figure is a diagrammatic showing of an apparatus assembly and a flow sheet which can be used to practice the invention.

In general outline, the process includes the hydrogenation of boron trichloride at an elevated temperature, to form dichloroborane, the hydrogenation reaction being discontinued at a favorable equilibrium by quick cooling to a temperature whereat Reaction 1 is not reversible or substantially so. The reaction between the boron trichloride and hydrogen is accomplished by passing the mixed gas stream through a suitable reaction chamber at a temperature of above 200° C. The specific reaction conditions and equipment to form diborane from boron trichloride and hydrogen are generally well known and form no part of this invention. As is known, the reaction temperature is about 700° C. under a pressure of about 190 p.s.i.g. The hydrogen to boron trichloride ratio is slightly in excess of that required for the reaction, preferably about 3:1 and up to from 10 to 15 to 1. The residence time in the reactor should be very short, e.g., of the order of 1 to 5 seconds.

Since the hydrogenation Reaction 1 is reversible but the reverse reaction is not favored at low temperatures, the reactor effluent is cooled as quickly as possible to preserve the more favorable yield of dichloroborane at a high temperature. To achieve this, the reactor effluent can be cooled in any desired manner as by being passed through a heat exchanger with the reactor feed being used as the coolant. This cooling serves to reduce the temperature of the effluent to about 300° C. in about 0.1 to 0.3 second at which the rate of decomposition of the dichloroborane is very low as compared to the rate at say about 475° C. The quenched reactor effluent can be further cooled by adding cold liquid boron trichloride.

It is desirable to remove hydrogen chloride formed in the hydrogenation reaction before disproportionating the dichloroborane to prevent the reverse Reaction 1 from proceeding to form boron trichloride at the expense of the dichloroborane. This is accomplished by absorbing the boron trichloride-dichloroborane from the cooled reactor effluent in additional cold boron trichloride. Hydrogen chloride and hydrogen are substantially insoluble in cold boron trichloride under the conditions existing in the primary absorber and pass out of the absorption zone as an overhead product. Under a moderate pressure, e.g., of the order of 160 p.s.i.g., it is possible to effect the separation of hydrogen, hydrogen chloride and dichloroborane without the use of refrigeration. The overhead gas stream from the primary absorber, containing hydrogen, hydrogen chloride and boron trichloride, is then cooled from about 33° C. to about −43° C. It is then brought into contact in a secondary absorber with chilled boron trichloride at about −43° and 150 p.s.i.g. to absorb the hydrogen chloride. The overhead product from the secondary absorber is relatively pure hydrogen, which can be compressed for recycle to the reactor; any boron trichloride present in this hydogen stream is not objectionable since it is a reactor feed material.

The bottoms from the secondary absorber consist of hydrogen chloride dissolved in boron trichloride. This is heated to about 100° C., as by heat exchange with the secondary absorbant stream, to evolve hydrogen chloride. The heated bottoms are then fed to the hydrogen chloride fractionator which is operated, for example, at about 300 p.s.i.g. to produce pure liquid anhydrous hydrogen chloride as an overhead product at about −8° C., and pure boron trichloride as a bottoms product at about 125° C. The hydrogen chloride can be used as such as recycled for production of additional boron trichloride. The bottoms product, boron trichloride, is recycled for reactor feed and absorbant.

The dichloroborane is removed from the primary absorber along with a large amount of boron trichloride and a trace of hydrogen. This is combined with the disproportionator bottoms and fed to the dichloroborane prefractionator, which serves to concentrate the dichloroborane and to remove boron trichloride. During the concentration, some diborane is formed. This will leave the column with the overhead vapor product, along with dichloroborane, which is then fed to a disproportionator to produce liquid diborane as an overhead product at about −68° C. and 75 p.s.i.g., with boron trichloride and any unconverted dichloroborane as a bottoms product.

Referring to FIGURE 1 in the drawing, hydrogen feed from line 6 and boron trichloride feed from line 7 are mixed with separate recycle streams 8 and 9, and are then sent through line 10 into a heater or furnace 11, wherein the temperature of the stream is raised before being passed through line 13 into the reactor 12.

The products of reaction and any unreacted components issue from the reactor through line 14 and are then sent into a cooler 16 wherein the temperature of the gases is lowered as rapidly as is possible, as has been explained. The cooled reactor effluent is then introduced through line 18 into a mid-portion of primary absorber 19. Boron trichloride is introduced through line 21 at the top of this absorber. Hydrogen is introduced at the bottom of the primary absorber through line 22 as a stripping agent. The effluent from the top of the absorber, hydrogen and hydrogen chloride, is removed through line 23 to a secondary absorber 24. This absorber is operated under such pressure and temperature that, for example, the effluent from the top of the column through line 25 is pure hydrogen. This is passed to the recycle compressor 26, which discharges into the line 8.

Separation of the hydrogen from hydrogen chloride is effected by using cold liquid boron trichloride introduced through line 27 at the top of the secondary absorber 24. The effluent from the bottom of the secondary absorber is hydrogen chloride dissolved in boron trichloride. This is removed through line 28 to the hydrogen chloride fractionator 29, from which hydrogen chloride is removed through line 31, while boron trichloride is removed through line 32 to the boron trichloride recycle line 9.

The effluent from the primary absorber 19 is removed through line 36 into the prefractionator 37, wherein the bulk of the boron trichloride is removed from admixture with the dichloroborane. The overhead stream comprises boron trichloride, diborane and dichloroborane. This is sent through line 38 into the disproportionator 39, from which diborane is removed as an overhead product through line 41, while boron trichloride, containing any unconverted dichloroborane, is returned through line 42 to the prefractionator.

As illustrative of the practice of the present invention, the following specific example is set forth. The relative units are expressed on a mole basis.

A hydrogen stream made up of 100 parts of fresh hydrogen and 34 parts of recycle hydrogen was fed into a preheater and the hydrogen was heated to 700° C. at 100 p.s.i.g. pressure. It was then mixed with 33 parts of boron trichloride, of which 28 parts were provided by fresh boron trichloride and 5 by recycle boron trichloride. The mixed stream was then further heated and passed into a reactor containing a reaction zone lined with silver and maintained at 700° C. under 190 p.s.i.g. pressure. The residence time of the gases was 0.5 second.

The issuing gas stream contained 93 parts of hydrogen, 7 of hydrogen chloride, 7 of dichloroborane and 26 of boron trichloride. It was introduced into the mid-section of a primary absorber, while 85 parts of recycle boron trichloride were introduced at the top of the absorber. The overhead gas stream, of 126 parts of hydrogen, 7 parts of hydrogen chloride and 26 parts of boron trichloride, was taken off at 33° C. and 159 p.s.i.g. for further processing in a secondary absorber to remove the hydrogen at −42° C. and 149 p.s.i.g. The bottoms were fed to a hydrogen chloride fractionator to remove the hydrogen chloride at 300 p.s.i.g. and −8° C.

34 parts of hydrogen were fed into the bottom of the primary absorber as a stripping agent while an exit stream, made up of 1 part of hydrogen to 7 of dichloroborane and 85 parts of boron trichloride, was sent as bottoms from the primary absorber directly to the dichloroborane fractionator and disproportionator, from which 90 parts of boron trichloride were taken off as a bottom fraction. The overhead product containing 1 part of hydrogen and 2 parts of diborane and two-tenths part of boron trichloride was taken off at 69° C. and 81 p.s.i.g.

We claim:

1. In a process for the manufacture of dichloroborane wherein boron trichloride is reacted with hydrogen at a temperature of about 700° C. and a pressure of about 190 p.s.i.g. to provide an exit gas stream containing hydrogen chloride, hydrogen, dichloroborane and boron trichloride, the steps of quenching the exit gas stream with cold liquid boron trichloride to lower the temperature thereof to about 300° C. in from about 0.1 to about 0.3 second, and thereafter adding additional colder liquid boron trichloride to the quenched exit gas stream at about 33° C. and a pressure of about 160 p.s.i.g. to dissolve selectively the dichloroborane and provide liquid boron trichloride containing dichloroborane in solution and a gas phase of undissolved gaseous hydrogen and hydrogen chloride.

2. In a process for the manufacture of diborane wherein boron trichloride is reacted with hydrogen at about 700° C. and a pressure of about 190 p.s.i.g. to provide an exit gas stream containing hydrogen chloride, hydrogen, dichloroborane and boron trichloride; the steps of cooling the exit gas stream with cold liquid boron trichloride to lower the temperature of the exit gas stream from the elevated temperature of reaction to about 300° C. in from about 0.1 to about 0.3 second, adding additional cold liquid boron trichloride to the cooled exit gas stream at about 33° C. and a pressure of about 160 p.s.i.g. to dissolve selectively the dichloroborane and provide a liquid phase of boron trichloride containing dichloroborane in solution and a gas phase of undissolved gaseous hydrogen and hydrogen chloride, and separating the gas phase from the boron trichloride solution of dichloroborane.

3. In a process for the manufacture of diborane wherein boron trichloride is reacted with hydrogen in a reaction zone at an elevated temperature of the order of 500° C. and above to provide an exit gas stream containing hydrogen chloride, hydrogen, dichloroborane and boron trichloride; the steps of cooling the exit gas stream to lower the temperature thereof from that of the reaction zone to a lower temperature of the order of 300° C.; contacting the cooled exit gas stream with liquid boron trichloride at a temperature of about 33° C. and a pressure of about 160 p.s.i.g. to selectively dissolve the dichloroborane in the liquid boron trichloride and leave a gas phase of hydrogen and hydrogen chloride; contacting said gas phase with liquid boron trichloride at a temperature of about −43° C. and a pressure of about 150 p.s.i.g. to dissolve only the hydrogen chloride in the boron trichloride and leave the hydrogen as a gas; and separating the hydrogen from the boron trichloride solution of hydrogen chloride.

References Cited by the Examiner

UNITED STATES PATENTS

| | | | |
|---|---|---|---|
| 2,127,571 | 8/1938 | Pardee | 183—115.7 |
| 2,288,865 | 7/1948 | Baehr | 183—115.7 |
| 2,469,879 | 5/1949 | Hurd | 23—204 |
| 2,875,028 | 2/1959 | Winternitz | 23—204 |
| 2,877,864 | 3/1959 | Cromwell | 183—14.57 |

FOREIGN PATENTS 584,747   10/1959   Canada.

OTHER REFERENCES

Carpenter: ARS Journal, vol. 29, pp. 10 and 13 to 14 (January 1959).

Hurd: J.A.C.S., 71, January 1949, pp. 20–22.

Schechter: "Boron Hydrides and Related Compounds," May 1954, second edition, Callery Chemical Company, pp. 2 and 3.

Schlesinger: J.A.C.S., 53 (1931), pp. 4321–4332.

BENJAMIN HENKIN, *Primary Examiner.*

ROGER L. CAMPBELL, CARL D. QUARFORTH,
*Examiners.*